April 2, 1929.  C. A. DESTRÉE  1,707,389
AUTOMATIC WEIGHING DEVICE FOR LIQUIDS
Filed Aug. 27, 1926   3 Sheets-Sheet 1

April 2, 1929.  C. A. DESTRÉE  1,707,389
AUTOMATIC WEIGHING DEVICE FOR LIQUIDS
Filed Aug. 27, 1926  3 Sheets-Sheet 2
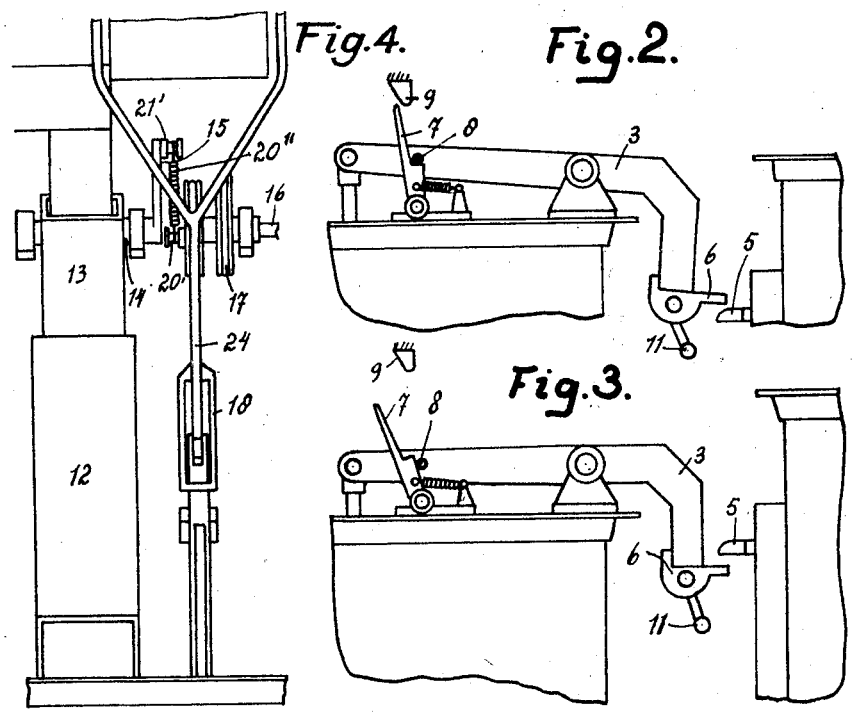
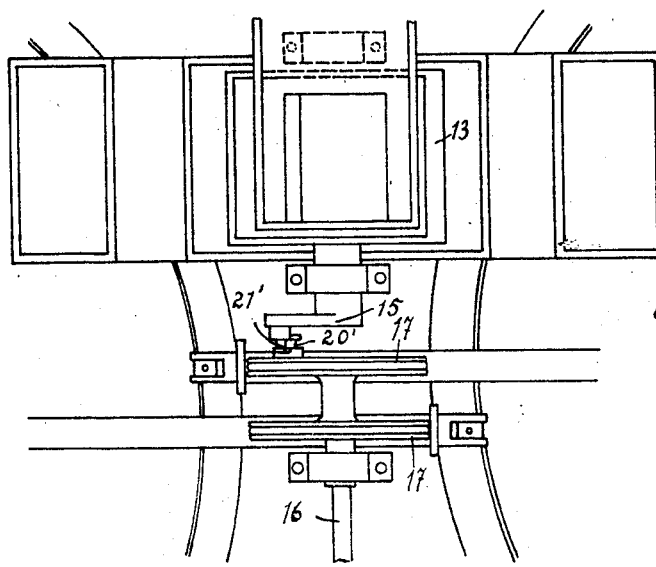

April 2, 1929.  C. A. DESTRÉE  1,707,389
AUTOMATIC WEIGHING DEVICE FOR LIQUIDS
Filed Aug. 27, 1926  3 Sheets-Sheet 3

Inventor
Charles Arent Destrée
By Pennie, Davis, Marvin & Edmonds
Attorneys

Patented Apr. 2, 1929.

1,707,389

UNITED STATES PATENT OFFICE.

CHARLES ARENT DESTRÉE, OF MODJOKERTO, JAVA, DUTCH EAST INDIES.

AUTOMATIC WEIGHING DEVICE FOR LIQUIDS.

Application filed August 27, 1926, Serial No. 131,896, and in Dutch East Indies May 4, 1925.

This invention relates to weighing devices, more particularly to weighing devices for the measurement of various quantities of liquids.

When various quantities of liquids are weighed in the receptacles of known devices, it is important that the supply of liquid be shut off when the quantity in the receptacle reaches a predetermined amount. The shutting off of the supply requires a certain amount of time with the result that when the flow of liquid is not substantially constant, the amount contained in the receptacles will vary from one weighing to the next and each succeeding quantity will not be the same as the one previously determined. Moreover, the amount of time required for the shutting off of the supply may vary due to the fact that the apparatus is more or less worn. Another source of inaccuracy is thus created in the present known devices inasmuch as they are based upon weighing exactly the same quantity each time.

To overcome such difficulties and to provide a device more efficient than those now in use, I have constructed a device whereby the filling of a plurality of receptacles is accurately measured and registered, and the operation of weighing various quantities of liquid considerably simplified. According to my invention, I may employ a plurality of suspended and balanced receptacles connected through suitable mechanism to floats operating in liquid filled chambers. The action of the floats is such that their immersion in their operating liquid is proportional to the load applied to the balancing mechanism to which the measuring receptacles are secured. Instead of employing floats of large diameter adapted to provide the total balancing action for the receptacles I may provide smaller floats combined with suitable counterweights. In such case the weighing may be made more accurate because of the greater sensitiveness of the smaller floats.

For a better understanding of the invention reference is made to the following drawings wherein:—

Fig. 2 is a view of the controlling means mounted on each receptacle in the position occupied just before the closing moment.

Fig. 3 is a view of the controlling means in the position occupied just before the opening moment.

Fig. 4 is a side elevation of the device of Fig. 1 showing the reciprocating supply hopper with its controlling means.

Fig. 5 is a top view of the device of Fig. 4.

Figure 1:
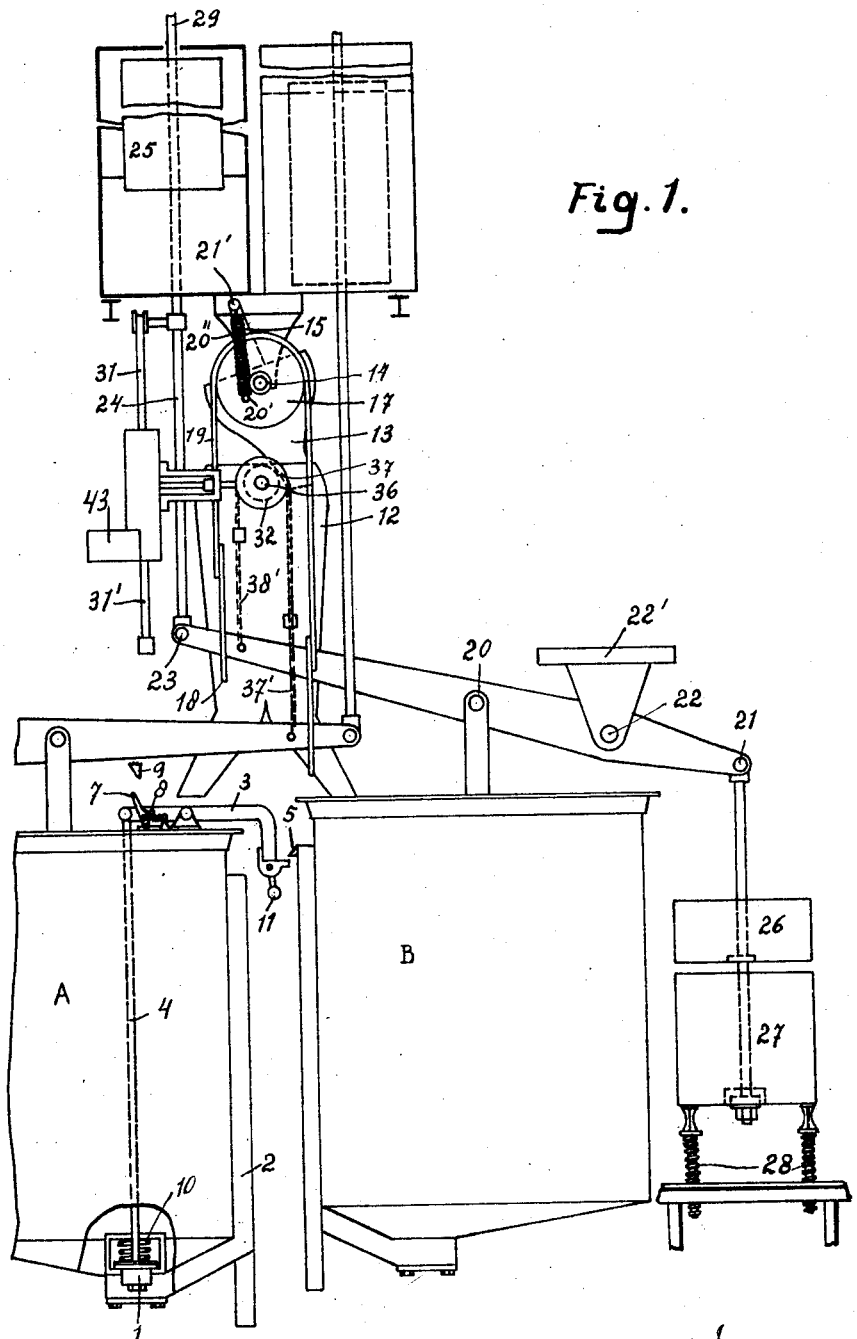
Fig. 1 is an elevation of the device of the present invention, with several elements left out for clearness.

Considering the invention more in detail in connection with the foregoing drawings which represent one embodiment of the invention, it is to be noted that a plurality of weighing receptacles are provided, suspended from lever arms and counterbalanced by suitable weights and buoyant floats. The receptacles are provided with means for filling them and valves for emptying them, and registering devices record the filling of each receptacle.

The weighing receptacles A and B are pivotally suspended upon knife edges or other similar means from the lever arms. The balance arms are pivoted at a point between their ends and the connecting links between the receptacles and the arms are located to one side of the pivot point of the arms. To the ends of the arms are connected the buoyant floats and the counterweights. The receptacles, floats and counterweights therefore represent a system of forces acting to move the arm through an arc about its pivot point. The distances from the points of attachment of the floats, receptacles and counterweights to the pivot point of the arm depend upon the size of the floats and the weight of the receptacles; the counterweights may be adjusted within any desired range. The action of the device is such that when the receptacles are filled they exert a downward pull upon the lever arm which is counteracted by the buoyancy of the float and the weight of the counterweights. When the receptacles are emptied, they rise under the upward force of the float and the downward force of the counterweights.

The weighing receptacles are each provided on their underside with a valve 1 (shown only on A) through which the liquid may pass into a siphon 2. When the receptacles have been filled beyond the highest point of the siphon, they are automatically emptied upon the opening of the valve. By the provision of a siphon for emptying the receptacles, it is possible to weigh all of the liquid because the siphon prevents any liquid from passing without being weighed because of a leaky valve.

The valve operating mechanism (shown only on A) is located on the top of the receptacles. A connecting bar 4 is therefore interposed between the valve 1 and an operating lever 3, the actuation of which opens the valve. After the receptacle A has been filled and the filling of B is begun it descends. As the receptacle B moves downward a projection 5 on the side thereof engages a pawl 6 on the receptacle A. The engagement of the pawl 6 rotates the lever 3 and opens the valve 1. The receptacle A is therefore emptied and it in turn begins to rise. Before the pawl 6 escapes the projection 5 another pawl 7 is operated by the movement of the lever 3 to engage a pin 8 and hold the valve 1 in open position.

As the emptying receptacle A rises, the locking pawl 7 engages an abutment 9 which releases the pawl 7 from the pin 8 and causes the valve 1 to return to its closed position under the influence of a spring 10. The pawl 7 is so shaped that after the valve has been released, the pin 8 strikes against it to remove it from engagement with the stud 9 so that the accurate weighing will not be affected. The pawl 6, which is rotatably connected to the free end of the lever 3, carries a small weight 11 in such a position that the pawl may be deflected upwardly upon the rising of the receptacle B and yet fall back into normal position after the projection 5 has passed.

The receptacles A and B are pivotally suspended from the balance lever arms by means of suitable balance pivots 20, such as knife edges or ball bearings. The lever arms are in turn pivoted to the frame or other suitable stationary member at 22. On the same side of the lever arms as the receptacles, but at a point 23 situated at a greater distance from the supporting point 22 than the pivots 20 a rod 24 is pinned to the balance lever arms (shown only in connection with receptacle B). This rod 24 carries the float 25.

The counterweights 26 and 27 are pivotally connected to the balance lever arms at 21 and are so supported that when their corresponding receptacle is empty the weight 27 rests on an adjustable support 28. A certain amount of play is provided between the counterweights 26 and 27 so that the liquid, which after the emptying is occasionally left in the receptacle, causes a greater or lesser immersion of the corresponding float 25 without removing the counterweight 27 from the support. The weight of the receptacle, the liquid left therein and the other parts working upon this side of the beam are thus counterbalanced by the weight 26 and the immersion of the float 25. The connection between the rod 24 and the float 25 may be established by means of a frame (not shown in the drawing) outside of the float tank, to which frame the float is connected by a rod 29.

It is evident that the level of the liquid varies with the immersion of the float, so that the registering device must be constructed with regard to the horizontal sections of both the float and the float receptacle.

Above and between the receptacles A and B is arranged a double hopper 12 with an outlet spout for each receptacle. Above this double hopper is arranged a reciprocating hopper 13 secured to a shaft 14, which is actuated by a crank 15. In axial alignment with the shaft 14 another shaft 16 (see Fig. 4) is provided, which carries two discs 17. Around each of these discs a flexible tape 19 is arranged having one end connected to the disc and the other end to a small yoke frame 18 (Figs. 1 and 4) through which the corresponding balance lever protrudes. If after a filling the receptacle B descends, its corresponding frame 18 will be lowered by the action of the lever arm. The lowering of the yoke 18 causes a pull on the tape 19, which pull is transmitted to the discs 17 to rotate them through an angle commensurate with the lowering of the lever arms.

The disc 17 which is nearest to the shaft 14 carries a pin 20' connected to a pin 21' of the crank 15 by means of a spring 20''. When the receptacle B is caused to descend the discs 17 are turned under the action of the tape 19 and the pin 20' is moved to the right. When the pins 20' and 21' approach a position to the right of the center of the shaft 14, the pin 20' under the pull of the spring 20'' is further moved to the right until it stops against a notch (not shown in the drawings). Due to this action of the spring 20'' the pin 21' is drawn to the right, whereby the hopper 13 is moved into the position for filling the receptacle A.

The yoke frame 18 is of such a shape that the balance lever, starting from its highest position, moves freely before pressing down the frame. The further turning of the discs 17 under the action of the spring 20'' causes the frame 18 to lower to such an extent that the lever in its lowest position is sufficiently free from the yoke so that it cannot spoil the accurate weighing of the liquid. During the lowering of the lever and before it engages the frame 18, the registering device of the other receptacle is uncoupled (as explained below) and the valve of this receptacle is opened. Thereafter this receptacle rises. It is thus impossible for the tapes 19 to produce a raising action of either of the receptacles upon the other.

Figure 6:
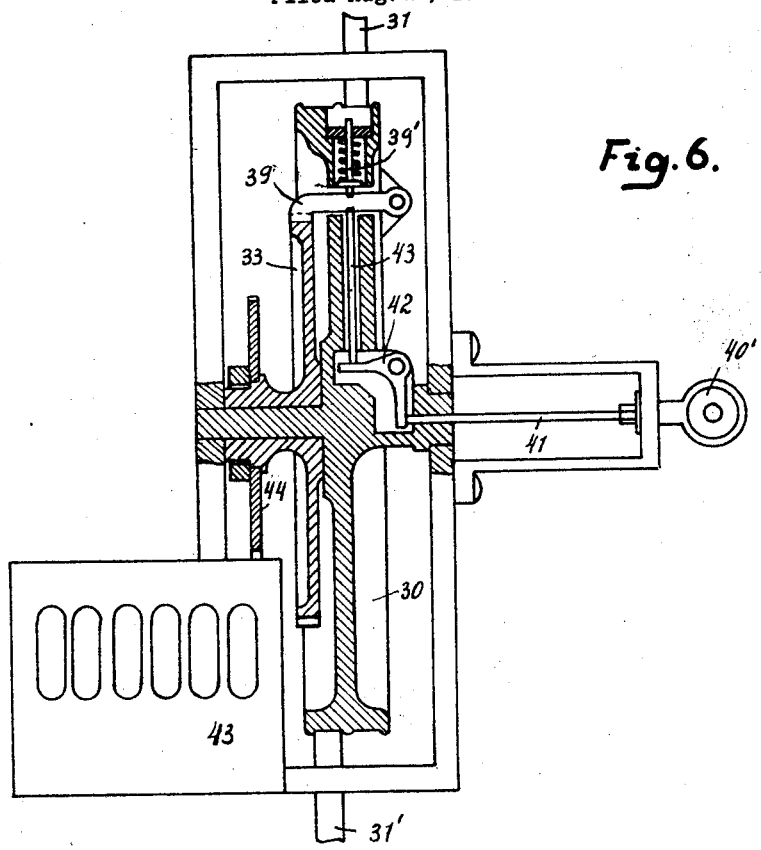
Fig. 6 is a sectional view of the registering apparatus.
Figure 7:
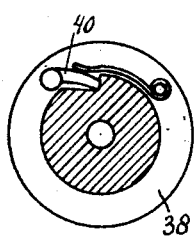
Figs. 7, 8 and 9 are sectional views of the mechanism for coupling the counting mechanism.

Each registering device comprises two discs 30 and 33 (see Fig. 6) which may be connected to each other by a brake-block or a pawl 39 (under the latter condition the disc 33 is formed as a pawl-wheel). Around the disc 30 two tapes 31 and 31' are wound, one pair of ends of which are connected to the disc while the other end of the one tape 31 is connected to the bar 24 of the balance lever and the free end of the other tape 31' carries a small weight for stretching the tape 31. Then as the lever is raised and lowered the disc 30 is alternately turned in one and then in the other direction.

Figure 8:
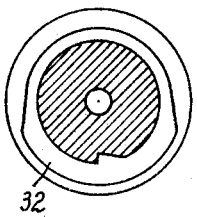
Figure 9:
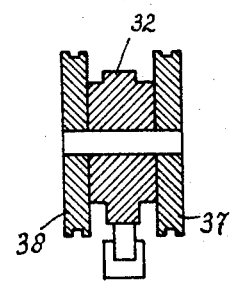

By means of a cam-disc 32 (Figs. 1, 8 and 9) the discs 30 and 33 are coupled together when the lever is in its highest position and uncoupled from each other when the lever is in its lowest position, so that by the interposition of toothed wheels 44 only that distance through which the float is lowered at each weighing, is conveyed to the counting mechanism 45. This mechanism may be such that with each weighing, that weight of the liquid which is counterbalanced by the counterweights is also registered. It is to be understood, however, that separate counting mechanism may be employed for indicating the number of weighings, which number multiplied by the weight of the counterweights should then be added to the weight indicated by the other counting mechanism of the same balance lever.

The cam-disc 32 with two sprocket wheels 37 and 38 is arranged to rotate about a shaft 36 and is provided at each side with a recess so that it also functions as a ratchet-wheel. Over each sprocket-wheel is laid a chain, the one end of which is connected to its corresponding balance lever and the other end of which carries a small weight. The chains are indicated at 37' and 38' (the weights are shown only in Fig. 1). The diameter of the sprocket-wheels 37 and 38 is such that they are turned through an angle somewhat greater than 180° with each lowering or raising of the lever in order to insure an exact meshing of the pawls 40, which are carried by the sprocket-wheels, with the recesses in the cam-disc 32. The cam of the disc 32 is so shaped that at the beginning of the lowering of the receptacle B the registering device of the receptacle A is uncoupled by the interaction of the roll 40' (see Fig. 6), the rod 41, the angle lever 42, the rod 43 and the brake-block 39 in opposition to the pushing action of the spring actuated piston 39'.

The operation of the apparatus may be described as follows:

Assuming that the receptacle A is filled and the hopper 13 has been transposed, the receptacle B begins to fill and descend (these conditions are shown in Fig. 1). After a small descent of B, during which reciprocating movements of the receptacle A are extinguished, the brake-block 39 of the registering device of the receptacle A is raised by the turning of the cam-disc 32, so that this registering device cannot be actuated by the subsequent rising of the receptacle A. Shortly thereafter, the valve 1 of the receptacle A is opened by the engagement of the projection 5 with the pawl 6 (Figs. 1 and 3). The receptacle A then begins to empty and consequently rises. When A has nearly reached its highest position, the pawl 7 is removed from under the pin 8 by the action of the stud 9, whereupon the valve 1 is closed.

During the further descent of the receptacle B after engaging the pawl 6, the registering device of the receptacle A is again put into action by the further turning of the cam-disc 32, and finally the hopper 13 is transposed to the filling position for the receptacle A. It is thus evident that each registering device is actuated only by the motion of its corresponding balance lever in so far as such motion is caused by the filling of the receptacle in question. Even if after the emptying of a receptacle a small quantity of liquid is left therein such small quantity is not weighed or registered twice because when the registering device is uncoupled at a low position of the float it is coupled at a correspondingly low position.

It will therefore be understood that the operation of the weighing device is entirely automatic and its control both simple and efficient. In some instances, it may be advisable to add an additional quantity of liquid to the float tanks during operation in order to replenish the supply but it is not essential because the registering devices only register the differences between the consecutive highest and lowest positions of the floats during each weighing cycle. For the same reason it is not necessary to provide constant supervision of the operation or to adjust the apparatus to zero for each series of weighings. Since all of the moving parts are controlled by the weight of the liquid quantities to be measured and not by electrical or other means, the apparatus is very stable and its adjustment is not very easily disturbed. The degree of exactness of the weighing may be regulated as desired by choosing that cross-section of float and float tank which gives the desired degree of accuracy.

It is to be understood that the foregoing description and drawings illustrate but one embodiment of my invention. It is not intended that the device is to be limited to the construction shown and described but instead includes such embodiments and modifications thereof as fall within the scope of the appended claims.

I claim:

1. An automatic weighing device for liquids comprising a plurality of pivoted balance levers, receptacles adapted to contain liquid pivotally suspended from said levers on one side of the pivotal points thereof, counterweights suspended from said levers on the other side of said pivotal points, buoyant floats connected to said levers on one side of the pivotal points thereof, means on each of said receptacles for controlling the emptying of the other receptacle, and means connected to said levers for registering the weighing of the liquid in said receptacles.

2. An automatic weighing device for liquids comprising a plurality of balance levers, receptacles adapted to contain liquid suspended from said levers on one side of the pivotal points thereof, means for filling said receptacles, means on the bottom side of said receptacles for emptying them, counterweights suspended from said levers on the other side of said pivotal points, floats connected to said levers on one side of the pivotal points thereof, means on each of said receptacles for controlling the emptying of the other receptacle, and means for registering the weighing of the liquid in said receptacles.

3. An automatic weighing device in accordance with claim 1 characterized by the fact that said registering means is coupled and uncoupled from its operative position by the action of each of said receptacles upon the other.

4. An automatic weighing device in accordance with claim 1 characterized by the fact that each receptacle is provided with a siphon through which the liquid must stream after leaving the receptacle, whereby all of the liquid contained in the receptacle is weighed.

5. An automatic weighing device in accordance with claim 1 characterized by the fact that each lever in its highest and lowest position is balanced free of all external contact tending to disturb the accuracy of the weighing operation.

6. An automatic weighing device in accordance with claim 1 characterized by the fact that the filling and emptying of the receptacles and the actuation of the registering means are at least partially controlled by weight of the liquid contained in said receptacles.

In testimony whereof, I have signed my name to this specification.

CHARLES ARENT DESTRÉE.